United States Patent [19]
McVey et al.

[11] Patent Number: 5,479,477
[45] Date of Patent: Dec. 26, 1995

[54] METHOD AND APPARATUS FOR ASSIGNING A CONTROL MODULE TO A COMMUNICATION RESOURCE IN A DISPATCH RADIO COMMUNICATION SYSTEM

[75] Inventors: Timothy L. McVey, Fox River Grove; Arthur L. Fumarolo, Schaumburg; Peggy K. Matson, Chicago, all of Ill.

[73] Assignee: Motorola, Inc., Schaumburg, Ill.

[21] Appl. No.: 206,298

[22] Filed: Mar. 3, 1994

[51] Int. Cl.$^6$ ........................................ H04Q 7/28
[52] U.S. Cl. ........................... 379/58; 455/8; 455/9; 455/17; 455/34.1; 455/53.1
[58] Field of Search ............. 379/58, 59; 455/8–25, 455/33.1, 34.1, 53.1, 54.1

[56] References Cited

U.S. PATENT DOCUMENTS

| | | | |
|---|---|---|---|
| 4,698,805 | 10/1987 | Sasuta et al. | 455/17 |
| 4,901,314 | 2/1990 | Lohrbach | 455/8 |
| 4,995,095 | 2/1991 | Lohrbach et al. | 455/9 |
| 5,040,237 | 8/1991 | Barnes et al. | 455/8 |
| 5,086,506 | 2/1992 | Hall et al. | 455/8 |
| 5,212,724 | 5/1993 | Nazarenko et al. | 379/58 |
| 5,230,078 | 7/1993 | Varela et al. | 455/9 |
| 5,239,538 | 8/1993 | Teel, Jr. et al. | 379/58 |
| 5,365,590 | 11/1994 | Brame | 455/33.1 |
| 5,369,783 | 11/1994 | Childress et al. | 455/17 |
| 5,377,185 | 12/1994 | Bardusk | 379/59 |
| 5,384,776 | 1/1995 | Gulliford et al. | 370/85.1 |
| 5,392,278 | 2/1995 | Teel et al. | 370/58.3 |
| 5,420,577 | 5/1995 | Kim et al. | 455/8 |

*Primary Examiner*—Dwayne D. Bost
*Attorney, Agent, or Firm*—Daniel C. Crilly; James A. Coffing

[57] ABSTRACT

A dispatch radio communication system (100) employs a method (200) and apparatus (101) for assigning one of a console station's control modules (113–115) to a communication resource. The assignment is initiated by associating (203) each control module (113–115) with a group of supported resource features and associating (205) each communication resource with a group of employed resource features. The latter association is then used to establish (211) a minimum set and an extended set of resource feature requirements for a particular communication resource that is to be added to a console station (109). The former association is used to identify (217) a group of candidate control modules (113–115) at the console station (109) that can support at least the minimum set of resource feature requirements. Upon identification of the candidate group (113–115), the candidate control module (e.g., 113) that supports a maximum number of the extended set of resource feature requirements is automatically assigned (225) to the particular communication resource.

10 Claims, 2 Drawing Sheets

METHOD AND APPARATUS FOR ASSIGNING A CONTROL MODULE TO A COMMUNICATION RESOURCE IN A DISPATCH RADIO COMMUNICATION SYSTEM

FIELD OF THE INVENTION

The present invention relates generally to dispatch radio communication systems and, in particular, to a method and apparatus for assigning a control module to a communication resource in a dispatch radio communication system.

BACKGROUND IF THE INVENTION

Dispatch radio communication systems are known to comprise a data router, a plurality of base stations or repeaters that provide a plurality of communication resources, and a plurality of console stations that control allocation of the communication resources to users of the dispatch communication system. Each console station is operated by a dispatch operator and typically includes a plurality of control modules. The communication resources typically comprise radio frequency carriers, time slots conveyed via radio frequency carriers, or telephone lines.

During installation of a typical dispatch communication system, each console station is provided with a programmable read only memory (PROM) that contains a predetermined list of communication resources, corresponding aliases for each communication resource, and a list of corresponding resource features employed by each communication resource. The list of communication resources includes those communication resources whose resource features can be supported by a particular control module. For communication resources other than telephone lines, the resource features might include the capability to receive data signals or decode an encrypted voice signal. For telephone resources, the resource features might include providing call hold or forwarding capabilities.

Each control module can control, or be assigned to, one of the communication resources in the communication resource list upon selection of the communication resource by the dispatch operator. To select the particular communication resource, the dispatch operator scrolls through the list of communication resource aliases, which may be quite lengthy, until the alias for the particular communication resource is identified. A communication resource alias is typically a code word or number that is associated with a communication resource. For example, a communication resource exclusively used by the fire department might be designated with the alias "Fire;" whereas, a telephone resource might be identified by its corresponding telephone number. Depending on the length of the communication resource list, the selection process might require several minutes to complete.

Although assignment of a control module to a communication resource using the scroll list approach results in an acceptable assignment, this approach often results in an inefficient assignment. As mentioned above, each communication resource typically employs a plurality of resource features, some of which are essential to function and others which are desired, but not essential to function. During assignment using the above approach, the dispatch operator can only view the communication resource aliases and cannot view the list of resource features for each alias. Accordingly, the dispatch operator arbitrarily assigns an available (i.e., unassigned) control module that can support the communication resource to be added to the communication resource. Since the dispatch operator cannot compare the list of resource features employed by the communication resource with the resource features that the assigned control module can support, the dispatch operator cannot determine whether or not the assigned control module is the control module that allows the most efficient use of the resource features employed by the communication resource (i.e., provides support for at least some of the the desired resource features). Thus, some assignments are inherently inefficient because control modules that support only the essential resource features of particular communication resources are assigned to those communication resources while other control modules, which support at least some of the communication resources' desired features, might be available.

Another dilemma encountered in prior art dispatch communication systems occurs when a change is required in the characteristics of the dispatch communication system. This change typically results from the addition of communication resources to the dispatch system. To accommodate a change in system characteristics, prior art techniques require the disabling of the console station whose control modules might be assigned to the additional communication resources, so that the console station can be installed with a new PROM and any other necessary hardware modifications (e.g., additional control modules). This hardware alteration process can result in considerable system down time. Accordingly, prior art dispatch communication systems are generally not conducive to operating environments requiring continual changes in system characteristics.

In addition to the problems associated with accommodating changes in system characteristics, existing dispatch communication systems are typically restricted in their ability to provide adequate support of telephone resources within their control modules. Prior art control modules that support telephone resources commonly include a permanent, single-tone ringer, similar to the bell ringer incorporated into most telephones. The ringer informs the dispatch operator of an incoming telephone call on a particular control module. However, since the finger is a permanently installed, single-tone finger, the ringer within a particular control module always rings with the same cadence and ring-tone, or pitch, regardless of which telephone resource is assigned to that control module. Thus, with prior art control modules, audible identification of a telephone resource that is assigned to a control module is highly improbable due to the limitations inherent in the single-tone ringer. For example, a high priority incoming call from a police chief is audibly indistinguishable from a standard incoming call.

Therefore, a need exists for a method and apparatus for assigning control modules to communication resources that substantially reduce the complexity of the assignment process and that accommodate changes in system characteristics. Further, such a system that provides tracking of a telephone resource's ring-tone and cadence with the telephone resource would be an improvement over the prior art.

DESCRIPTION OF A PREFERRED EMBODIMENT

Generally, the present invention provides a method and apparatus for assigning one of a console station's control modules to one of a plurality of communication resources in a dispatch radio communication system. This is accomplished by first associating each control module with a group of supported resource features and associating each communication resource with a group of employed resource features. The latter association is used to establish a minimum set and an extended set of resource feature requirements for a particular communication resource that is to be added to a console station. The former association is used to identify a group of candidate control modules at the console station that can support at least the minimum set of resource feature requirements. Upon identification of the candidate group, the candidate control module that supports a maximum number of the extended set of resource feature requirements is automatically assigned to the particular communication resource. By assigning control modules to communication resources in this manner, the present invention reduces the number of operator steps performed during the control module assignment process, and thereby significantly reduces the amount of time utilized by the console station operator during a control module assignment, as compared to control module assignment techniques of the prior art.

Figure 1:
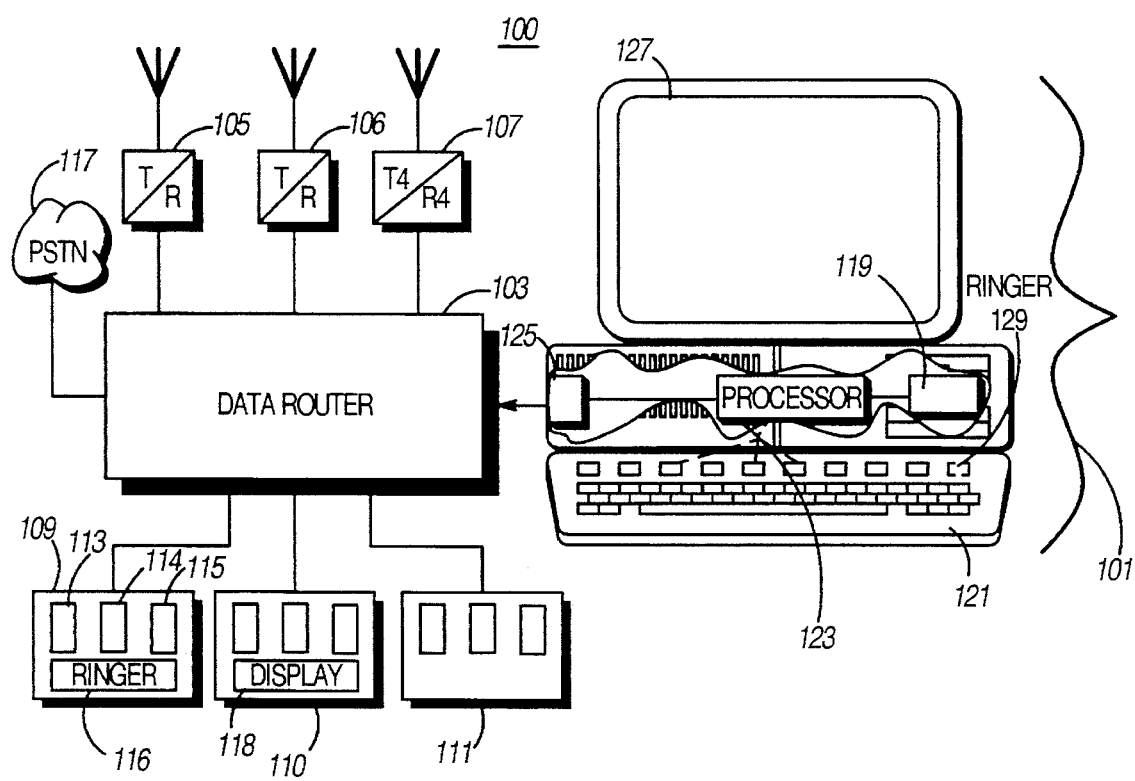
FIG. 1 illustrates an exemplary dispatch radio communication system, in accordance with the present invention.

The present invention can be more fully described with reference to FIGS. 1–2. FIG. 1 illustrates an exemplary dispatch radio communication system 100, in accordance with the present invention. The dispatch radio communication system 100 comprises a control terminal 101, a data router 103, a plurality of repeaters, or base stations 105–107 (three shown), and a plurality of console stations 109–111 (three shown). As shown, each console station 109–111 includes a plurality of control modules 113–115. In a preferred embodiment, each console station (e.g., 109, 110) further includes a ring generator 116 and/or a display 118.

The data router 103 preferably comprises a computer electronics bank (CEB), such as a Motorola Centracom Series II Plus Switch. The base stations 105–107 include fixed site transceivers that transmit and receive messages using one or more communication resources that are monitored by the plurality of console stations 109–111. As an example, base stations 105, 106 include one transceiver that can transmit and receive messages using one communication resource, while base station 107 includes one transceiver that can transmit and receive messages using any one of four selectable communication resources.

The communication resources may comprise wireless and/or wireline resources depending on the dispatch system configuration. The wireless resources might include frequency carriers, pairs of frequency carders, time slots, or pairs of time slots depending on the multiplexing scheme utilized in the particular dispatch radio communication system 100. For example, in a frequency division multiple access (FDMA) system, the communication resources comprise frequency carders or pairs of frequency carders (i.e., one frequency carrier for transmitting and one frequency carder for receiving); whereas, in a time division multiple access (TDMA) system, the communication resources comprise time slots or pairs of time slots. The wireline resources preferably comprise telephone resources (i.e., telephone lines). It should be noted that when telephone resources are utilized in the dispatch radio communication system 100, the data router 103 is coupled to the public-switched telephone network (PSTN) 117.

In a preferred embodiment, the control terminal 101 comprises a database 119, an input device 121, a processor 123, an output device 125, a cathode ray tube (CRT) 127, and a ring generator 129. The database 119 preferably comprises a plurality of registers in a memory of the control terminal 101 that store information submitted via the input device 121 into a tabular format. In the preferred embodiment, the database 119 employs at least one of the registers for storing ring attributes (later described) of telephone resources. In an alternate embodiment, a database management software package, such as the commercially available Microsoft "ACCESS" package, might be used to control entry of the information and subsequent access to the entered information.

The input device 121 preferably comprises an alphanumeric keyboard; whereas, the processor 123 preferably comprises a microprocessor, such as a microprocessor from the Motorola 68000 series of microprocessors. The processor is used to manipulate and maintain the contents of the database 119. In addition, when the contents of the database 119 are altered, the processor 123 sends messages to the data router 103, via the output device 125, that instruct the data router 103 to route the incoming data in accordance with the database alterations. For example, when a console station (e.g., 111) is removed from service for maintenance purposes, the database 119 is preferably altered by the control terminal's operator, via the input device 121, to reflect this condition. Upon detecting this database alteration, the processor 123 instructs the data router 103 to temporarily inhibit the flow of data between the disconnected console station 111 and any base stations assigned to the disconnected console station 111.

The preferred output device 125 includes a combination of a known RS-232 serial port and a serial data modulator/demodulator (MODEM). The output device 125 accepts information from either the data router 103 or the processor 123 and forwards the information to the processor 123 or data router 103, respectively. The CRT 127 is known and might comprise any very high resolution graphics adapter (VGA) compatible monitor. The ring generator 129 comprises a programmable computer sound module that might be programmed using the Microsoft "WINDOWS SOUND SYSTEM" control program. The programmable sound module might be any commercially available device that is capable of generating audio tones under software control.

As mentioned above, the console stations 109–111 include their respective control modules 113–115, and preferably comprise Motorola Centracom Series II Plus stations, although other comparable console stations 109–111 might alternatively be used. The control modules 113–115 comprise known dispatch radio operator positions. These control modules 113–115 typically include radio control functions, such as a volume control, frequency control buttons and indicators, patch buttons, a telephone hold button, and a telephone off-hook button. In a preferred embodiment, the console stations 109–111 further include a ring generator 116 and a display 118. The ring generator 116 preferably comprises an audio multiple frequency generator; whereas, the display 118 preferably comprises an eight character alpha-numeric display.

General operation of the dispatch radio communication system 100 occurs in the following manner. During set-up of the dispatch communication system 100, the database 119 is loaded, via the input device 121, with two tables of information. The first table associates each control module 113–115 with a set of system resource features that each control module 113–115 can support. For example, one control module (e.g., 109) might support resource features such as data and telephone interconnect; whereas, another control module (e.g., 110) might support the resource feature of encryption. It should be noted that the quantity and types of resource features utilized by the dispatch communication system 100 are dependent upon the system configuration and that the exemplary quantity and types disclosed herein are not considered to be exhaustive.

The second table associates each communication resource with a set of system resource features that each communication resource employs. The second table is preferably divided into two sections. The first section associates each communication resource with a minimum, or requisite, set of employed resource features and the second section associates each communication resource with an extended, or desired, set of employed resource features. For instance, the communication resource provided by base station 105 might always be used to transceive encrypted data, but may periodically be used to access the PSTN 117. In this case, the minimum set of resource features employed by the communication resource comprises data and encryption, and the extended set of resource features comprises telephone interconnect.

In a preferred embodiment, the second table also associates each communication resource with its corresponding alias, such as a telephone number for a telephone resource or a talk group identification for an allocated radio frequency carrier. In addition, when the dispatch system 100 provides interconnection to the PSTN 117, the second table associates each communication resource being used as a telephone resource with its corresponding ring attribute (i.e., ring-tone and cadence type). As is known, the cadence is the ringing format, such as ringing or beeping, and the ring-tone is the pitch of the ringing. In the preferred embodiment, the ring-tone and cadence of a particular telephone resource may be audibly provided by the ring generator 129 upon selection of the particular telephone resource, via the input device 121, by a user of the control terminal 101. Once the database 119 is loaded, the user of the control terminal 101 may view the two association tables via the CRT 127.

Upon loading the database 119 with the aforementioned association tables, the control terminal 101 accommodates assignment of communication resources to control modules 113–115. When a communication resource needs to be added to a console station (e.g., 116), a user of the control terminal 101 identifies the communication resource and enters the communication resource's identification (e.g., alias) along with the desired destination console station 116 into the processor 123 via the input device 121. The processor 123, or an alternate processing device, surveys the second table and determines the minimum set and the extended set of resource feature requirements for the identified communication resource. The processor 123, or an alternate processing device, then searches the first table to identify which available control modules 113–115, if any, at the destination console station 116 can support at least the minimum set of resource features and the extended set of resource features employed by the identified communication resource. Upon identifying this candidate group of control modules (e.g., 113–114), the processor 123 selects the candidate control module that supports the maximum number of resource features in the extended set and automatically assigns the selected control module (e.g., 113), via the output device 125 and the data router 103, to the identified communication resource.

The automatic assignment is preferably accomplished by transmitting the identification of the selected control module 113, the identification of the identified communication resource, the alias of the identified communication resource, and, if applicable, the ringtone and cadence information from the database 119, via the processor 123 and the output device 125, to the data router 103. The data router 103 receives the information and forwards the applicable information to the selected control module 113. In a preferred embodiment, once the assignment is made, the alias of the identified communication resource is automatically displayed to a user of the control module via the display 118. In addition, the ring-tone and cadence of the identified communication resource (if the identified communication resource is a telephone resource) are provided to the selected control module 113, such that they may be audibly annunciated via the ring generator 116 to the user of the selected control module 113 upon reception of a telephone call. To complete the assignment process, the database 119 is updated to reflect the current assignment. The assigned control module 113 is considered to be unavailable for any subsequent assignments until the current assignment is terminated.

As described above, the present invention provides for automatic assignment of control modules 113–115 to communication resources based on a coordination of resource features. Thus, the present invention significantly reduces the manual process steps associated with prior art methods of performing the assignment and, unlike the prior art, allows ring-tones to track their respective telephone resources, as opposed to having fixed ring-tones at each control module 113–115. Accordingly, the present invention substantially reduces the amount of time required to assign a control module (e.g., 113) to a particular communication resource and provides for enhanced system flexibility by eliminating the need for cumbersome hardware modifications associated with prior art techniques for changing system characteristics.

Figure 2:
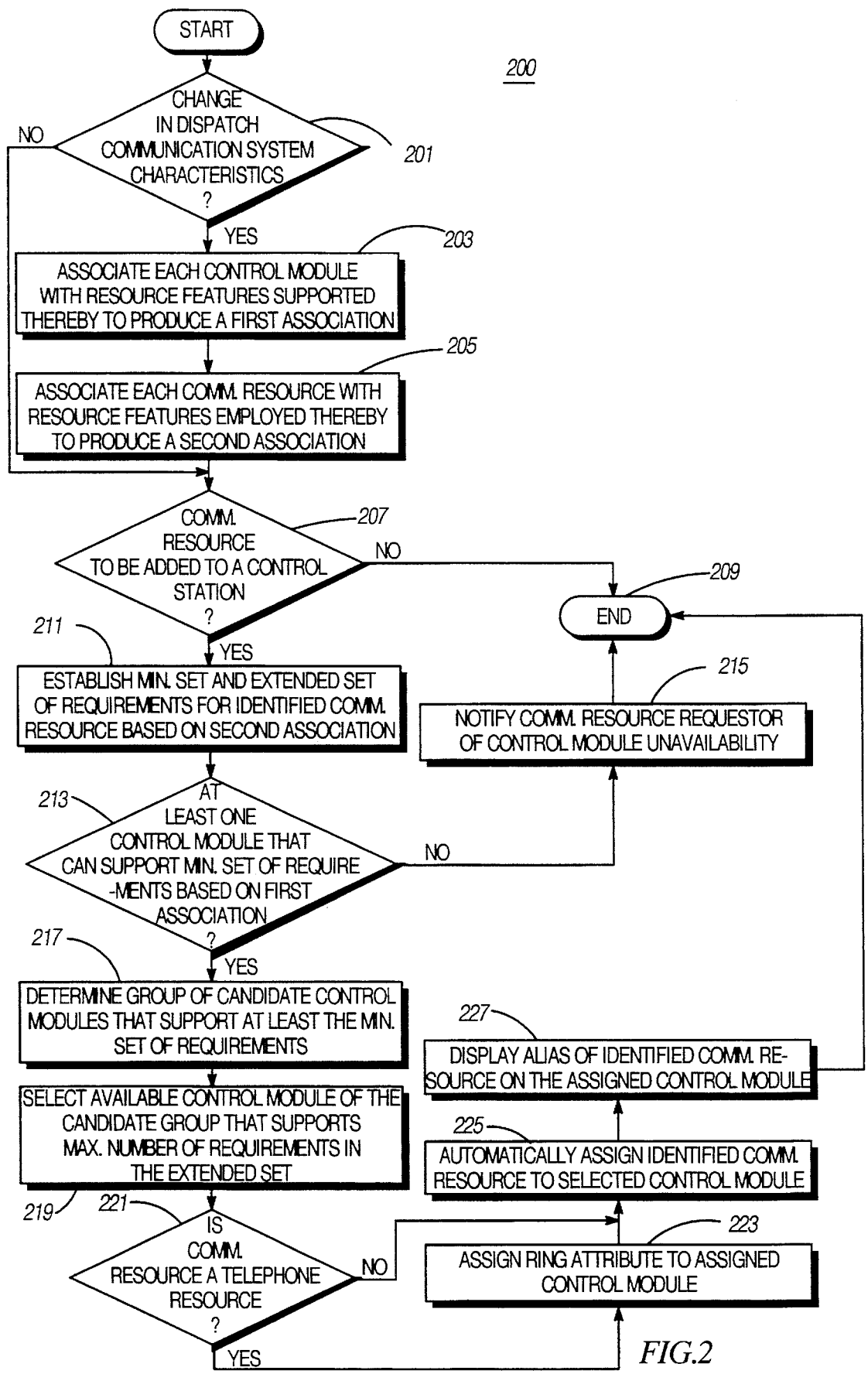
FIG. 2 illustrates a logic flow diagram of steps executed to assign a control module to a communication resource, in accordance with the present invention.

FIG. 2 illustrates a logic flow diagram 200 of steps executed to assign a control module to a communication resource, in accordance with the present invention. The logic flow begins when the dispatch radio communication system determines (201) whether there is a change in system characteristics. Such a change might be caused, for example, by the addition of a talkgroup to the system—i.e., if the system has trunking capability, the addition/deletion of base stations to the dispatch system, or the addition/deletion of telephone resources to the dispatch system. When a change in system characteristics is detected, the control terminal ascertains a relationship between each control module and the resource features supported thereby by associating (203) each control module with its supported resource features to produce a first association. As mentioned above with regard to FIG. 1, each control module supports one or more resource features—such as data, telephone interconnect, and selectable encryption. Accordingly, each control module is directly associated with the resource features that it supports. In addition to associating each control module with its supported resource features, the control terminal ascertains a relationship between each communication resource and the resource features employed thereby by associating (205) each communication resource with its employed resource features to produce a second association. Similar to the first association, the second association directly links each communication resource to its corresponding resource features. Each association is preferably established by inputting the appropriate information via the control terminal's input device. However, each association might alternately be established by extracting the appropriate information from other databases in the dispatch communication system.

Upon production of the first and second associations, or when no changes in the system characteristics are detected (201), the dispatch radio system determines (207) whether a communication resource is to be added to a console station. A communication resource might be added to a console station due to an emergency situation that requires multiple console station users to monitor the communication resource, or when an employee shift change occurs in which an incoming user of the console station does not have the same responsibilities as the outgoing user. When a communication resource is to be added to a console station, the control terminal establishes (211) a minimum set and an extended set of resource feature requirements based on the second association (i.e., the mapping of the communication resources to their employed resource features). Otherwise, the logic flow ends (209). As earlier described, the minimum set of resource feature requirements is the set of requisite resource features that is essential to the use of a particular communication resource and, accordingly, must be supported by a control module that is to be assigned to that particular communication resource. The extended set of resource feature requirements is the set of resource features that is desired, but not required, to enhance the effectiveness of the particular communication resource. For example, a telephone resource might have a minimum set of requirements that includes an on-hook/off-hook control and a ring indicator, and an extended set of requirements that includes a resource hold control.

Upon establishing (211) the minimum and extended sets of resource feature requirements, the control terminal determines (213) whether at least one available control module can support the minimum set of resource feature requirements based on the first association. That is, the first association is examined to determine whether the minimum set of resource feature requirements is a subset of the resource features supported by any of the available control modules. An available control module is a control module that is not currently assigned to a communication resource. When there is no available control modules that can support the minimum set of resource feature requirements, the control terminal notifies (215) the communication resource requestor (e.g., the control terminal operator) of the control module unavailability and the logic flow ends (209).

When at least one available control module is identified, the control terminal determines (217) a group of candidate control modules that support at least the minimum set of resource feature requirements. The candidate group includes all the available control modules at the target console station that can support no less than the minimum set of resource feature requirements. The candidate group is examined and the control terminal selects (219) an available control module from the candidate group that supports the maximum number of resource feature requirements in the extended set.

Upon selection (219) of the available control module, the control terminal determines (221) whether the identified communication resource is a telephone resource. When the identified communication resource is a telephone resource, the dispatch system automatically assigns (223, 225) the identified communication resource and its corresponding ring attribute to the selected control module. The control terminal informs the target console station of the impending assignment by providing the console station with the identities of the selected control module and the additional communication resource. In addition, the control terminal sends the telephone resource's ring attribute and alias (e.g., telephone number) to the selected control module to permit the control module's ring generator to ring with the appropriate ring-tone and cadence and to enable the control module to visually display the alias to the control module's user. For example, a telephone resource utilized by the police department might have a unique ring-tone and cadence as compared to a standard telephone resource, thus enabling the control module's user to audibly identify an incoming high priority police call. When the communication resource is not a telephone resource, the dispatch radio system automatically assigns (225) only the identified communication resource and transfers its alias to the selected control module.

After the communication resource is assigned (225) to the selected control module, the communication resource's alias is displayed (227) on the assigned control module and the logic flow ends (209). By displaying the alias on the control module, the operator of the assigned control module is visually informed, on a continual basis, as to which communication resource is being controlled by the assigned control module.

In the above discussion with reference to FIG. 2, it should be noted that all the functional steps performed by the control terminal could be equivalently performed by alternate electronic devices, such as personal computers or computer workstations, that have data storage and processing capabilities.

The present invention provides a method and apparatus for assigning one of a console station's control modules to one of a plurality of communication resources in a dispatch radio communication system. With this invention, the number and complexity of the manual steps necessary to assign a communication resource to a control module in prior art dispatch communication systems is significantly reduced. For example, a typical prior art assignment comprises at least four manual steps that require approximately twenty minutes to complete since two of the required steps necessitate hardware changes in the console station. On the other hand, the present invention requires only one manual step to complete the assignment. This one step does not require any hardware changes and can be performed in less than 10 seconds. Further, the present invention associates a ring-tone and cadence with a particular telephone resource and allows a user of the control module assigned to the particular telephone resource to conveniently hear the associated ring-tone and cadence. In contrast, the prior art dispatch communication systems provided unchangeable ring-tones and cadences at each equipped control module. Thus, every telephone resource assigned to a prior art control module had an indistinguishable ring-tone and cadence (i.e., the single ring-tone and cadence originally installed into the control module). Still further, the present invention provides automatic assignment of the assigned communication resource's alias to the assigned control module's user; whereas, prior art systems require the user to scroll through lists of aliases during the communication resource assignment process until the assigned communication resource's alias is identified.

What is claimed is:

1. In a dispatch radio communication system that includes a console station for monitoring a plurality of communication resources, the console station including a plurality of control modules for supporting a plurality of resource features employed by the plurality of communication resources, a method of assigning one of the plurality of control modules to an identified communication resource of the plurality of communication resources, the method comprising the steps of:

A) ascertaining a first association between each of the plurality of control modules and those of the plurality of resource features supported thereby;

B) ascertaining a second association between at least one of the plurality of communication resources and those of the plurality of resource features employed thereby;

C) using the second association to establish a minimum set of resource feature requirements and an extended set of resource feature requirements for the identified communication resource;

D) using the first association to identify a group of candidate control modules that are included in the console station, wherein each candidate control module supports at least the minimum set of resource feature requirements; and E) automatically assigning an available one of the group of candidate control modules to the identified communication resource, wherein the assigned control module supports a maximum number of the extended set of resource feature requirements.

2. The method of claim 1, further comprising the step of displaying, on the assigned control module, an alias associated with the identified communication resource.

3. The method of claim 1, wherein the identified communication resource comprises a telephone resource having a ring attribute associated therewith and wherein the method further comprises the step of assigning the ring attribute to the assigned control module.

4. In a dispatch radio communication system that includes a console station for monitoring a plurality of communication resources, the plurality of communication resources including at least one telephone resource having a ring attribute associated therewith, the console station including a plurality of control modules for supporting a plurality of resource features employed by the plurality of communication resources, a method of assigning one of the plurality of control modules to an identified telephone resource, the method comprising the steps of:

A) ascertaining a first association between each of the plurality of control modules and those of the plurality of resource features supported thereby;

B) ascertaining a second association between at least one of the plurality of communication resources and those of the plurality of resource features employed thereby;

C) using the second association to establish a minimum set of resource feature requirements and an extended set of resource feature requirements for the identified telephone resource;

D) using the first association to automatically assign an available one of the plurality of control modules included in the console station to the identified telephone resource and the ring attribute associated therewith, wherein the assigned control module supports at least the minimum set of resource feature requirements.

5. The method of claim 4, wherein step (D) further comprises the steps of:

D1) using the first association to identify a group of candidate control modules, wherein each candidate control module supports at least the minimum set of resource feature requirements; and D2) automatically assigning an available one of the group of candidate control modules to the identified telephone resource, wherein the assigned control module supports a maximum number of the extended set of resource feature requirements.

6. The method of claim 4, further comprising the step of displaying, on the assigned control module, an alias associated with the identified telephone resource.

7. A control terminal that controls assignment of a plurality of communication resources to a console station that includes a plurality of control modules, the control terminal comprising:

a database that associates each of the plurality of control modules with communication resource features supported thereby to produce a first association and at least one of the plurality of communication resources with communication resource features employed thereby to produce a second association;

input means for providing an identification of one of the plurality of communication resources to be added to the console station to produce an identified communication resource;

first processing means, operably coupled to the database and the input means, for determining, based on the second association, a minimum set of resource feature requirements and an extended set of resource feature requirements for the identified communication resource;

second processing means, operably coupled to the first processing means, for selecting, based on the first association, one of the plurality of control modules included in the console station to be assigned to the identified communication resource, wherein the selected control module supports at least the minimum set of resource feature requirements and a maximum number of the extended set of resource feature requirements; and output means, operably coupled to the second processing means and the console station, for automatically assigning the selected control module to the identified communication resource.

8. The control terminal of claim 7, wherein the plurality of communication resources include at least one telephone resource having a ring attribute associated therewith, and wherein the database further comprises at least one ring-tone register that associates each telephone resource with a corresponding ring attribute.

9. The control terminal of claim 7, wherein the plurality of communication resources include at least one telephone resource having a ring attribute associated therewith, the control terminal further comprising a ring generator that provides a sample of the ring attribute for the at least one telephone resource to a user of the control terminal.

10. A control terminal that controls assignment of a plurality of communication resources to a console station, the plurality of communication resources including at least one telephone resource having a ring attribute associated therewith, the console station including a plurality of control modules, the control terminal comprising:

a database that associates each of the plurality of control modules with communication resource features supported thereby to produce a first association and at least one of the plurality of communication resources with communication resource features employed thereby to produce a second association, wherein the database includes at least one ring-tone register that associates each telephone resource with a corresponding ring attribute;

an input device that provides an identification of one of the plurality of communication resources to be added to the console station to produce an identified communication resource;

a first processing device, operably coupled to the database and the input device, that determines, based on the second association, a minimum set of resource feature requirements and an extended set of resource feature requirements for the identified communication resource;

a second processing device, operably coupled to the first processing device, for selecting, based on the first association, one of the plurality of control modules included in the console station to be assigned to the identified communication resource, wherein the selected control module supports at least the minimum set of resource feature requirements and a maximum number of the extended set of resource feature requirements;

an output device, operably coupled to the second processing device and the console station, for automatically assigning the selected control module to the identified communication resource; and a ring generator, operably coupled to the database, that provides a sample of a corresponding ring attribute for a particular telephone resource to a user of the control terminal.

* * * * *